United States Patent
Luo et al.

(10) Patent No.: US 12,066,857 B2
(45) Date of Patent: Aug. 20, 2024

(54) ELECTRONIC DEVICES

(71) Applicants: Beijing BOE Optoelectronics Technology Co., Ltd., Beijing (CN); BOE Technology Group Co., Ltd., Beijing (CN)

(72) Inventors: Zhenhua Luo, Beijing (CN); Hao Wu, Beijing (CN); Na An, Beijing (CN); Xiao Ma, Beijing (CN); Gang Ci, Beijing (CN); Xinfeng Gong, Beijing (CN); Shaopeng Xu, Beijing (CN); Zheng Zhang, Beijing (CN); Qingzhu Guan, Beijing (CN); Guochun Wang, Beijing (CN); Zuoxin Yu, Beijing (CN); Dianzhong Liu, Beijing (CN); Zheng Zong, Beijing (CN); Pengcheng Dong, Beijing (CN); Quan Long, Beijing (CN); Qidong Sun, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 303 days.

(21) Appl. No.: 17/607,350

(22) PCT Filed: Jan. 14, 2021

(86) PCT No.: PCT/CN2021/071836
§ 371 (c)(1),
(2) Date: Oct. 28, 2021

(87) PCT Pub. No.: WO2021/143782
PCT Pub. Date: Jul. 22, 2021

(65) Prior Publication Data
US 2022/0221905 A1   Jul. 14, 2022

(30) Foreign Application Priority Data

Jan. 16, 2020   (CN) .......................... 202010048171.7

(51) Int. Cl.
*G06F 1/16*   (2006.01)

(52) U.S. Cl.
CPC .......... *G06F 1/1616* (2013.01); *G06F 1/1626* (2013.01); *G06F 1/1656* (2013.01)

(58) Field of Classification Search
CPC .... G06F 1/1616; G06F 1/1626; G06F 1/1656; G06F 1/1637; G06F 1/1641; G06F 1/1681; G06F 1/1652
See application file for complete search history.

(56) References Cited

U.S. PATENT DOCUMENTS

| 8,662,731 B2* | 3/2014 | Wang | G06F 1/1652 |
| | | | 362/616 |
| 9,348,450 B1* | 5/2016 | Kim | H04M 1/0268 |

(Continued)

FOREIGN PATENT DOCUMENTS

| CN | 104506688 A | 4/2015 |
| CN | 104916230 A | 9/2015 |

(Continued)

OTHER PUBLICATIONS

PCT/CN2021/071836 international search report.
CN2020100481717 first office action.
CN2020100481717 second office action.

*Primary Examiner* — Rockshana D Chowdhury
(74) *Attorney, Agent, or Firm* — IPro, PLLC (57) ABSTRACT

The present application discloses an electronic device including a housing, support plates and a display panel. The housing is recessed inward to form one or more clearances penetrating the housing along a first direction. A number of the support plates is at least two, and one clearance is (Continued)

correspondingly arranged below adjoining parts of two adjacent support plates. The support plates are configured to support the display panel. The display panel is switchable between a folded position and an unfolded position. When the display panel is in the unfolded position, first surfaces of the support plates that abut against the display panel are flush. When the display panel is in the folded position, any two oppositely folded and adjacent support plates are separated by a part of the display panel that covers the any two oppositely folded and adjacent support plates when the display panel is in the unfolded position, and a part of the any two oppositely folded and adjacent support plates and a part of the display panel that covers the part of the any two oppositely folded and adjacent support plates when the display panel is in the unfolded position enter the clearance.

12 Claims, 9 Drawing Sheets

(56) References Cited

U.S. PATENT DOCUMENTS

| | | | |
|---|---|---|---|
| 9,557,771 B2 * | 1/2017 | Park | G06F 1/1681 |
| 10,469,635 B1 * | 11/2019 | Carlson | H04M 1/0277 |
| 11,048,305 B1 * | 6/2021 | Ye | G06F 1/1681 |
| 11,073,870 B2 * | 7/2021 | Yun | G09F 9/301 |
| 11,194,366 B2 * | 12/2021 | Cheng | G06F 1/1652 |
| 11,379,005 B2 * | 7/2022 | Xue | G06F 1/1681 |
| 11,417,848 B2 * | 8/2022 | Soh | H10K 59/12 |
| 11,474,570 B2 * | 10/2022 | Lee | G06F 1/1652 |
| 11,550,358 B2 * | 1/2023 | Cheng | G06F 1/1652 |
| 11,550,367 B2 * | 1/2023 | Lin | G06F 1/1681 |
| 11,615,722 B2 * | 3/2023 | Morino | G06F 1/1616 |
| | | | 345/173 |
| 11,644,873 B2 * | 5/2023 | Hsu | G06F 1/1681 |
| | | | 361/679.27 |
| 11,681,335 B1 * | 6/2023 | Hsu | G06F 1/1681 |
| | | | 361/679.01 |
| 11,726,527 B2 * | 8/2023 | Seo | G06F 1/1652 |
| | | | 361/679.01 |
| 11,768,525 B2 * | 9/2023 | Choi | G06F 1/1656 |
| | | | 361/679.01 |
| 11,775,015 B2 * | 10/2023 | Lee | G06F 1/1683 |
| | | | 361/679.27 |
| 2017/0201607 A1 | 7/2017 | Xu | |
| 2017/0205853 A1 | 7/2017 | Sun | |
| 2017/0285691 A1 * | 10/2017 | Baek | G06F 1/1652 |
| 2018/0343330 A1 | 11/2018 | Lin et al. | |
| 2019/0174645 A1 | 6/2019 | Jeon et al. | |
| 2019/0339742 A1 | 11/2019 | Jia | |
| 2019/0390703 A1 * | 12/2019 | Hsu | F16C 11/04 |
| 2020/0293094 A1 * | 9/2020 | Liu | G06F 1/1652 |
| 2020/0363843 A1 * | 11/2020 | Cheng | H04M 1/02 |
| 2021/0044682 A1 * | 2/2021 | Liu | H04M 1/0268 |
| 2021/0067614 A1 * | 3/2021 | Cheng | G06F 1/1681 |
| 2022/0217228 A1 * | 7/2022 | Hu | H04M 1/0216 |
| 2022/0338362 A1 * | 10/2022 | Morino | H05K 5/0226 |
| 2022/0353355 A1 * | 11/2022 | Liao | G06F 1/1681 |

FOREIGN PATENT DOCUMENTS

| | | |
|---|---|---|
| CN | 105611006 A | 5/2016 |
| CN | 205978043 U | 2/2017 |
| CN | 107092303 A | 8/2017 |
| CN | 107833522 A | 3/2018 |
| CN | 108173995 A | 6/2018 |
| CN | 108345358 A | 7/2018 |
| CN | 108874048 A | 11/2018 |
| CN | 208421694 U | 1/2019 |
| CN | 208421695 U | 1/2019 |
| CN | 208705766 U | 4/2019 |
| CN | 109788095 A | 5/2019 |
| CN | 110445913 A | 11/2019 |
| CN | 111240413 A | 6/2020 |
| EP | 3109847 B1 | 3/2020 |
| KR | 20190020303 A | 2/2019 |
| WO | 2017114469 A1 | 7/2017 |

* cited by examiner

ELECTRONIC DEVICES

CROSS-REFERENCE TO RELATED APPLICATIONS

This application is the U.S. national phase of PCT Application No. PCT/CN2021/071836, filed on Jan. 14, 2021, which claims priority to Chinese Patent Application No. 202010048171.7, titled "ELECTRONIC DEVICES", filed on Jan. 16, 2020, the contents of all of which are incorporated herein by reference in their entirety.

TECHNICAL FIELD

This application relates to the field of display, and in particular, to an electronic device with a display function.

BACKGROUND

With the advancement of technologies, foldable electronic devices are becoming more and more sought after by users. However, a total length of a display panel of a foldable electronic device cannot be changed, which results in an uneven surface of the display panel during the folding of the electronic device, and further affects user experience.

SUMMARY

The present application provides an electronic device. The electronic device includes: a housing recessed inward to form one or more clearances penetrating the housing along a first direction; support plates, where a number of the support plates is at least two, and one clearance is correspondingly arranged below adjoining parts of two adjacent support plates; a display panel where the support plates are configured to support the display panel. The display panel is switchable between a folded position and an unfolded position; when the display panel is in the unfolded position, first surfaces of the support plates that abut against the display panel are flush; when the display panel is in the folded position, any two oppositely folded and adjacent support plates are separated by a part of the display panel that covers the any two oppositely folded and adjacent support plates when the display panel is in the unfolded position, and a part of the any two oppositely folded and adjacent support plates and a part of the display panel that covers the part of the any two oppositely folded and adjacent support plates when the display panel is in the unfolded position enter a corresponding clearance.

Further, the number of the support plates is two, and the two support plates correspond to one clearance. Two end surfaces of each of the support plates along the first direction are respectively provided with a fixation point, and the support plates are rotatable around respective fixation points. Along a second direction, each of the support plates includes a first end and a second end, and the first end is far away from the clearance relative to the second end. The second direction is perpendicular to the first direction. Each of the support plates includes a first support section and a second support section, the first support section extends from the first end to the fixation points, and the second support section extends from the second end to the fixation points. When the display panel is in the unfolded position, the second support sections are located above the clearance; when the display panel is in the folded position, the second support sections are located inside the clearance.

Further, a length of the second support sections along the second direction is same as a depth of the clearance. When the display panel is in the folded position, surfaces of the second support sections abut against a surface of the clearance.

Further, the electronic device further includes: connecting mechanisms. Two ends of each of the connecting mechanisms are respectively connected with the fixation points on the end surfaces of the two support plates on a same side along the first direction.

Further, each of the connecting mechanisms includes at least three positioning points. Two of the positioning points are respectively connected with the fixation points on the end surfaces of the two support plates on the same side along the first direction, and remaining one of the positioning points is connected with the housing. Connecting lines of the three positioning points form a triangle.

Further, when the display panel is in the unfolded position, the second ends of the two support plates are in contact with each other.

Further, along a height direction, each of the support plates further includes a second surface, and the second surface is arranged opposite to the first surface. The height direction is perpendicular to the first direction and the second direction. At least at the second end of the support plates, the first surface and the second surface are connected by an arc, and in a direction from the second surface to the first surface, a size of the second end of the support plate gradually narrows.

Further, when the display panel is in the folded position, a distance between the two support plates is greater than or equal to a minimum bending diameter of the display panel.

Further, the number of the support plates is more than two. Along a second direction, each of the support plates includes two ends arranged oppositely, each of the support plates is respectively provided with fixation points on two end surfaces along the first direction and at a predetermined distance from the ends. The support plates are rotatable around respective fixation points, and the second direction is perpendicular to the first direction. Each of the support plates includes a first support section and two second support sections, on each of the end surfaces, the first support section extends from one of the fixation points to other of the fixation points, and the second support sections respectively extend from the ends to adjacent fixation points. When the display panel is in the unfolded position, each of the second support sections is located above a corresponding clearance; when the display panel is in the folded position, the second support sections on a folded side of the any two oppositely folded and adjacent support plates are located inside a corresponding clearance.

Further, lengths of the second support sections of each of the support plates are respectively same as a depth of a corresponding clearance. When the display panel is in the folded position, surfaces of the second support sections on the folded side of the any two oppositely folded and adjacent support plates abut against a surface of a corresponding clearance.

Further, the electronic device further includes: connecting mechanisms. Two ends of each of the connecting mechanisms are respectively connected with adjacent fixation points on end surfaces of two adjacent support plates on a same side along the first direction.

Further, each of the connecting mechanisms includes at least three positioning points. Two of the positioning points are respectively connected with the adjacent fixation points on the end surfaces of the two adjacent support plates on the same side along the first direction, and remaining one of the positioning points is fixedly connected with the housing. Connecting lines of the three positioning points form a triangle.

Further, the number of the connecting mechanisms is n, and the number of the support plates is n+1, where n is a positive integer.

Further, when the display panel is in the unfolded position, adjacent ends of the two adjacent support plates are in contact with each other.

Further, along a height direction, each of the support plates further includes a second surface, and the second surface is arranged opposite to the first surface. The height direction is perpendicular to the first direction and the second direction. At least at the adjacent ends of the two adjacent support plates, the first surfaces and the second surfaces are connected by arcs, and in a direction from the second surfaces to the first surfaces, sizes of the ends gradually narrow.

Further, when the display panel is in the folded position, a distance between the any two oppositely folded and adjacent support plates is greater than or equal to a minimum bending diameter of the display panel.

The technical solutions provided by the embodiments of the present disclosure can include the following beneficial effects: in the above arrangement, when the display panel is in the folded position, the display panel is bent and enters the clearance, avoiding heaping/piling of the display panel when the display panel is in the folded position, and avoiding a gap appearing between the support plates and the display panel when the display panel is in the unfolded position, which ensures the evenness of the display panel.

It should be understood that the above general description and the following detailed description are only exemplary and explanatory and are not restrictive of the present disclosure.

DETAILED DESCRIPTION OF THE EMBODIMENTS

Examplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present application. Rather, they are merely examples of apparatuses and methods consistent with some aspects of the present application as detailed in the appended claims.

The terms used in the present application are for the purpose of describing particular examples only, and are not intended to limit the present application. Terms determined by "a/an," "the," and "said" in their singular forms in the present application and the appended claims are also intended to include plural forms unless clearly indicated otherwise in the context. It should also be understood that the term "and/or" as used herein refers to and includes any or all possible combinations of one or more associated listed items.

It should be understood that "first," "second," and similar words used in the specification and claims of the present application do not represent any order, quantity or importance, but are used only to distinguish different components. Likewise, similar words such as "one," "a," or "an" do not represent a quantity limit, but represent that there is at least one. Unless otherwise indicated, similar words such as "front," "rear," "lower," and/or "upper" are only for convenience of description, and are not limited to one position or one spatial orientation. Similar words such as "including" or "comprising" mean that an element or an item appearing before "including" or "comprising" covers elements or items and their equivalents listed after "including" or "comprising", without excluding other elements or items. Similar words such as "connect" or "connected with each other" are not limited to physical or mechanical connections, and may include electrical connections, whether direct or indirect.

The embodiments of the present application will be described below in detail with reference to the drawings. In the case of no conflict, features in the following embodiments can be combined with each other.

Figure 1:
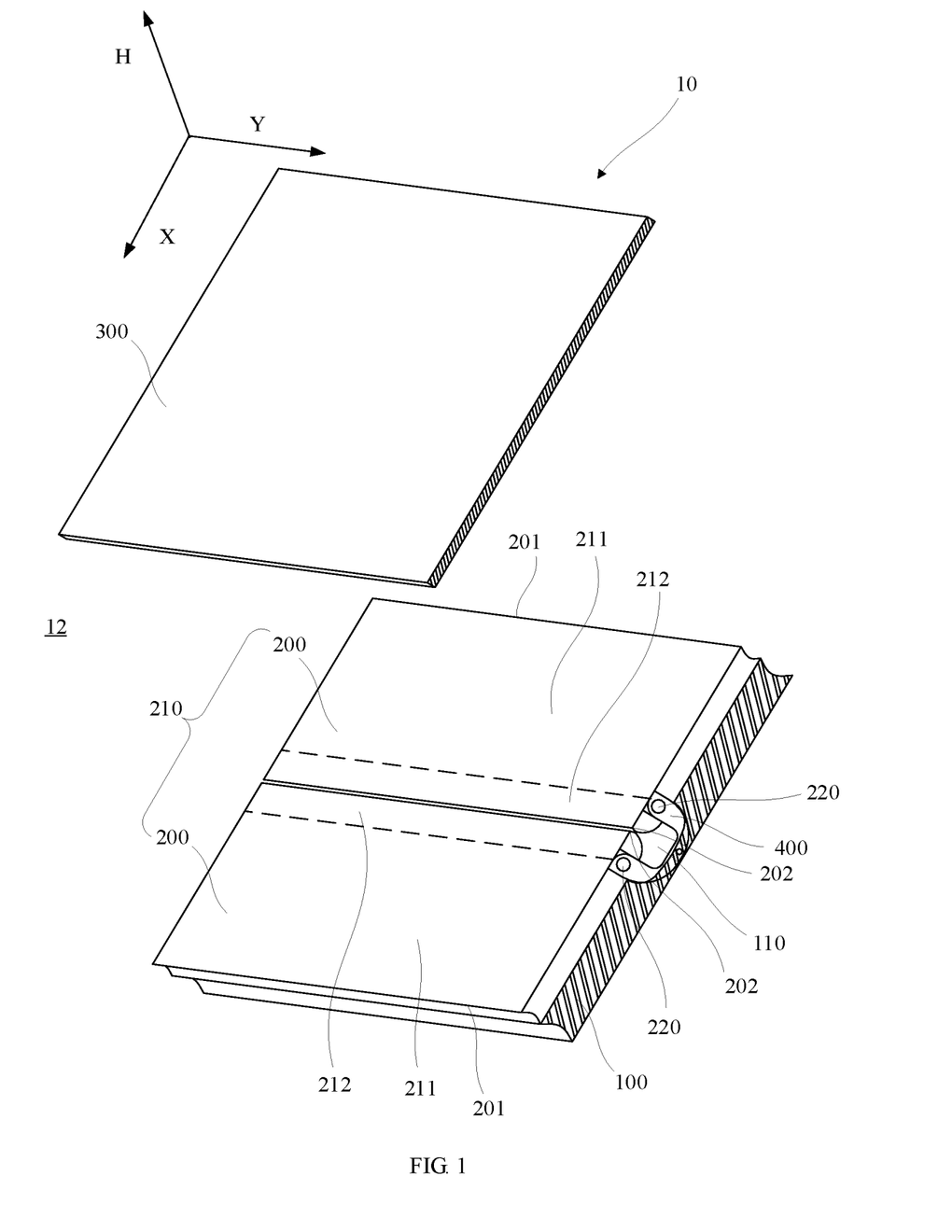
FIG. 1 is a schematic diagram illustrating an exploded structure of an electronic device according to an embodiment of the present application.

As shown in FIG. 1, the present application relates to an electronic device 10. The electronic device 10 is a foldable electronic device 10, which may be a mobile phone, a computer, a tablet, an electronic book or other devices. The electronic device 10 may be an LCD electronic device. Of course, it may alternatively be an OLED electronic device.

The electronic device 10 includes a housing 100, support plates 200, and a display panel 300.

A surface of the housing 100 is recessed inward to form a clearance 110. The clearance 110 penetrates the housing 100 along a first direction Y. The support plates 200 are disposed above the housing 100. A number of the support plates 200 is at least two. Two adjacent support plates 200 form a support body 210. The display panel 300 is used to realize smart display of the electronic device 10. The support plates 200 are configured to support the display panel 300. That is, the display panel 300 is fixed above the support plates 200. In an embodiment, the support plates 200 may be at least partially connected with the housing by snap-fitting. In another embodiment, the support plates may be at least partially connected with the housing by gluing, which is not particularly limited herein.

When the electronic device 10 is an LCD electronic device, the display panel 300 is a liquid crystal panel. The liquid crystal panel includes an upper substrate (not shown), a lower substrate (not shown), and a liquid crystal layer (not shown) between the upper substrate and the lower substrate. The liquid crystal layer is driven by an electric field generated between the upper substrate and the lower substrate to control display of images.

When the electronic device 10 is an OLED electronic device, the display panel 300 includes at least an organic light-emitting diode (not shown). The organic light-emitting diode includes an anode, a cathode, and an organic light-emitting layer between the anode and the cathode. In the organic light-emitting diode, holes from the anode and electrons from the cathode respectively migrate to the organic light-emitting layer, so that the organic light-emitting layer can emit light to display images.

Figure 2:
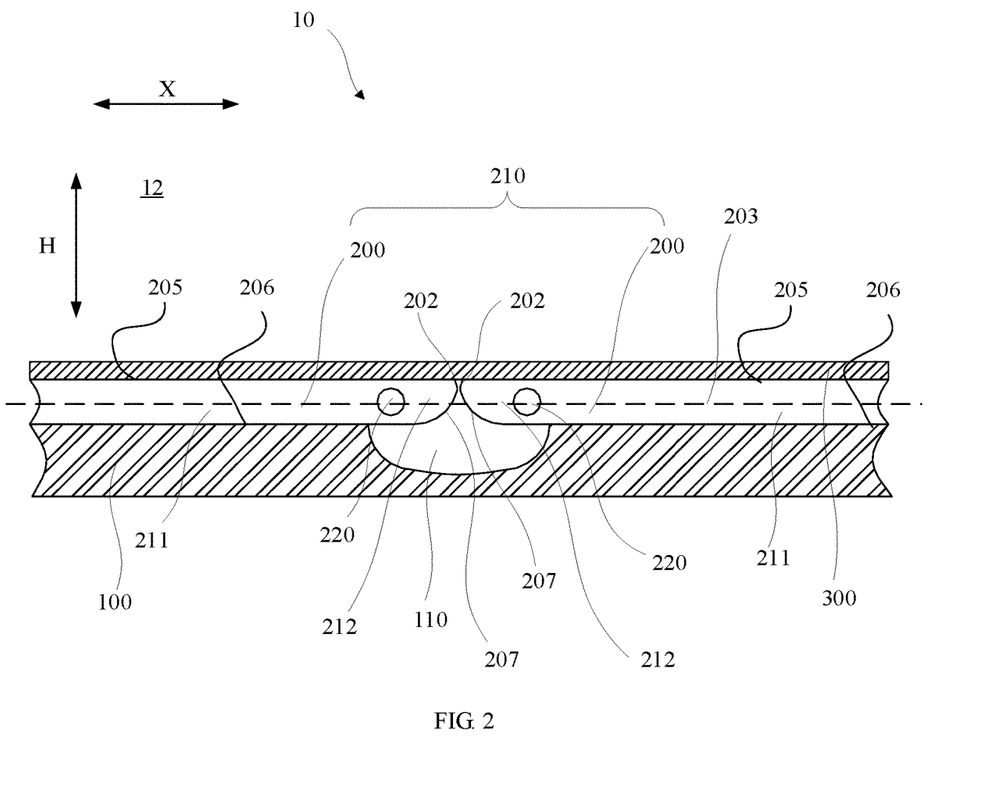
FIG. 2 is a schematic diagram illustrating a structure of an electronic device according to an embodiment of the present application.
Figure 3:
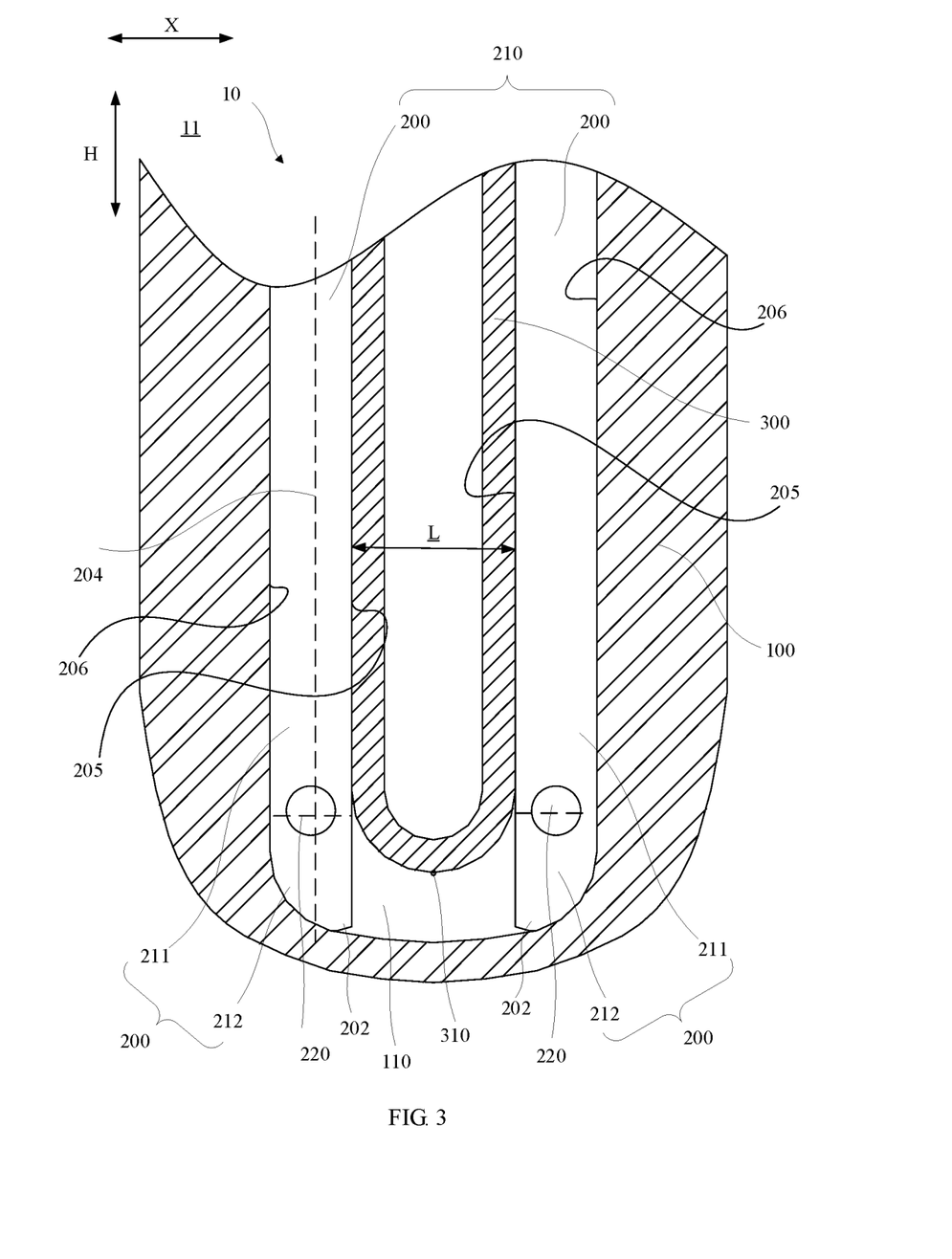
FIG. 3 is a schematic diagram illustrating another structure of an electronic device according to an embodiment of the present application.

In an embodiment, as shown in FIGS. 2 and 3, the number of the support plates is two, and the display panel 300 can be switched between a folded position 11 and an unfolded position 12. When the display panel 300 is switched from the unfolded position 12 to the folded position 11, the two support plates 200 in the support body 210 are rotated oppositely, so that the display panel 300 is bent. Especially, the display panel 300 located above adjoining positions of the two support plates 200 is bent. Parts of the two support plates 200 enter the clearance 110, so that a part of the display panel 300 is driven to enter the clearance 110. When the display panel 300 is in the folded position 11, the two support plates 200 in the support body 210 are separated by the display panel 300.

It should be noted that, in order to clearly show various components and parts, oblique line segments are drawn in the display panel 300 and the housing 100, and the oblique line segments are not represented as cross-sectional lines.

A plane in which the display panel 300 is located when in the unfolded position 12 is used as a reference plane. When the display panel 300 is in the folded position 11, a lowest point 310 of the bent part of the display panel 300 is lower than the reference plane.

Figure 4:
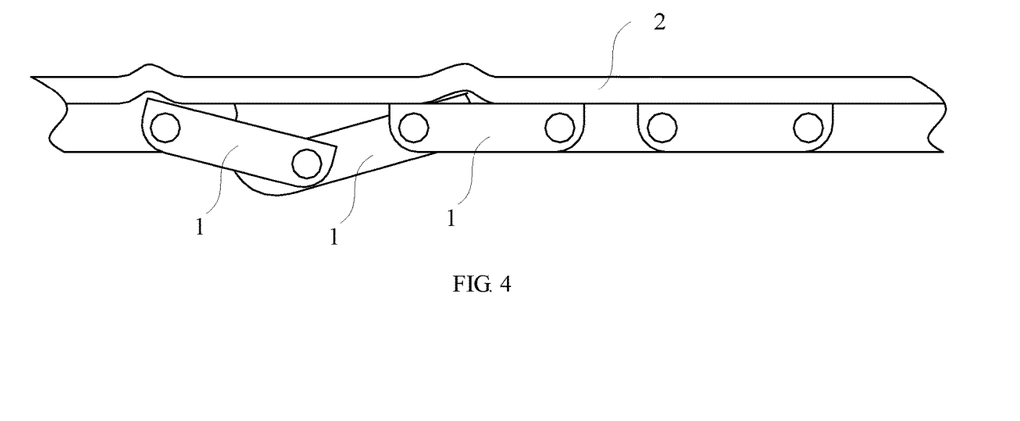
FIG. 4 is a schematic diagram illustrating a structure of a display panel and support plates.

In some designs, as shown in FIG. 4, no clearance is provided in the housing, and only a method of changing an overall size of a plurality of support plates 1 formed as a whole by connection thereof is adopted to avoid heaping/piling of a display panel 2. In this design, the plurality of support plates 1 are connected together to form a chain structure, and the overall size of the plurality of support plates 1 is larger than a size of the display panel 2. When the display panel 2 is caused to be in a folded position, relative positions of adjacent support plates 1 are changed, so that the display panel 2 moves as the support plates 1 move. During this process, some support plates 1 are rotated, and the plurality of support plates 1 formed as a whole by connection thereof are integrally recessed downward. The display panel 2 is recessed downward with the support plates 1. Since the overall size of the plurality of support plates 1 formed as a whole by connection thereof is larger than the size of the display panel 2, the display panel 2, when in the folded position, can completely fit the support plates 1, avoiding piling of the display panel 2. However, when the display panel 2 is in an unfolded position, since the overall size of the plurality of support plates 1 formed as a whole by connection thereof is larger than the size of the display panel 2, there is an angle between some adjacent support plates 1, that is, for some support plates 1, one end is far away from the display panel 2 relative to the other end, so that the display panel 2 is stretched flat. At the same time, this arrangement prevents the display panel from being deformed due to a stretch force. However, with such an arrangement, when the display panel 2 is in the unfolded position, not every part of the display panel 2 contacts the support plates 1, resulting in that a gap appears between the display panel 2 and the support plates 1, and a surface of the display panel 2 is uneven and prone to damage.

In this design, as shown in FIGS. 1 to 3, by providing the clearance 110, part of the display panel 300 that is bent can be accommodated in the clearance 110, thus avoiding piling of the display panel 300 when the display panel 300 is in the folded position 11. At the same time, when the display panel 300 is switched from the folded position 11 to the unfolded position 12, the part of the display panel 300 located in the clearance 110 is moved out of the clearance 110 and flattens, and is supported by the support plates 200. There is no gap between the support plates and the display panel, thus ensuring an evenness of the display panel 300 and avoiding the display panel 300 from being damaged.

It should be noted that the support plates 200 serve to fix the display panel 300. When the display panel 300 is in the unfolded position 12, all parts of the support plates 200 fit the display panel 300. However, since the display panel 300 is to be switched between the folded position 11 and the unfolded position 12, during the switching of the display panel 300 from the unfolded position 12 to the folded position 11, a part of the support plates 200 are separated from the display panel 300. It can be seen that the display panel 300 and the support plates 200 are not bonded with each other everywhere. Especially, a part of the display panel 300 located above an adjoining positions of two adjacent support plates 200 is not fixedly connected with the support plates 200 by means of gluing or the like. Therefore, when the display panel 300 is switched to the folded position 11, a part of the display panel 300 can be separated from and bent relative to the support plates 200, that is, a bent part of the display panel 300 smoothly joins attaching positions of the display panel 300 to the support plates 200, so that the display panel is protected.

With reference to FIG. 2 and FIG. 3, in this embodiment, when the display panel 300 is in the unfolded position 12, surfaces of two support plates 200 in the support body 210 are flush, and a plane in which the support plates 200 are located is used as a first plane 203. The first plane 203 is parallel to the reference plane formed by the display panel 300. When the display panel 300 is in the folded position 11, planes in which the two support plates 200 in the support body 210 are located are parallel and are used as second planes 204. It should be noted that the first plane 203 is perpendicular to the second planes 204. With the above arrangement, when the display panel 300 is in the folded position 11, folding the electronic device 10 in half can be achieved, which facilitates convenient accommodation of the electronic device 10. During the use of the electronic device 10, if the electronic device 10 is to be accommodated, the electronic device 10 can be folded in half to assume a form as shown in FIG. 3. At this time, the display panel 300 is bent and sandwiched by the housing 100 and the support plates 200, so that the display panel is protected, which avoids damages from the outside to the display panel 300 in the electronic device 10 during the accommodation of the electronic device 10. For example, if an existing electronic device is stored in a handbag or pocket, the display panel may be scratched by sharp objects such as keys or cards that are also placed in the handbag or pocket. In this embodiment, by setting the electronic device 10 in a foldable form, the display panel 300 can be completely surrounded by the housing 100 to avoid its surface being scratched by the sharp objects such as keys or cards. In this embodiment, when in the folded position 11, the display panel 300 may be in an off state.

In this embodiment, a number of the clearances 110 is one, so that the electronic device 10 can present a fold-in-half form. In other embodiments, the number of the clearances 110 can be two or three or more than three, so that the electronic device 10 can present various folded forms. Each clearance 110 needs to be provided with at least one support body 210 thereabove, and two adjacent support bodies 210 have one common support plate 200.

In this embodiment, the support plates 200 are provided with fixation points 220, and the support plates 200 can be rotated around the fixation points 220, so that the support plates 200 can drive the display panel 300 to be switched between the unfolded position 12 and the folded position 11.

As shown in FIG. 2 and FIG. 3, in conjunction with FIG. 1 when necessary, along a second direction X, each support plate 200 includes a first end 201 and a second end 202, and the first end 201 is far away from the clearance 110 relative to the second end 202. It should be noted that the second direction X is perpendicular to the first direction Y, and both the first direction Y and the second direction X are perpendicular to a height direction H. Each support plate 200 includes a first support section 211 and a second support section 212. The first support section 211 extends from the first end 201 to the fixation points 220, and the second support section 212 extends from the second end 202 to the fixation points 220. When the display panel 300 is in the unfolded position 12, the second support sections 212 are located above the clearance 110. When the display panel 300 is in the folded position 11, the second support sections 212 are located inside the clearance 110.

In the above arrangement, when the display panel 300 is in the unfolded position 12, a part of the display panel 300 located above the clearance 110 can be supported by the second support sections 212 of the support plates 200. During the switching of the display panel 300 from the unfolded position 12 to the folded position 11, the second support sections 212 of the support plates 200 located above the clearance 110 are rotated and enter the clearance 110, so that the part of the display panel 300 supported by the support plates 200 in the unfolded position also enters the clearance 110.

As shown in FIG. 3, when the display panel 300 is in the folded position 11, the display panel 300 located in the clearance 110 is in an arc shape to avoid stress concentration caused by excessive local deformation of the display panel 300. Moreover, when the display panel 300 is in the folded position 11, a distance L between two support plates 200 in the support body 210 is equal to or greater than a minimum bending diameter of the display panel 300. Each display panel 300 has a fixed minimum bending diameter, and the minimum bending diameter is a specific value. With the above arrangement, when folding the electronic device 10 in half is achieved, that is, when the display panel 300 is in the folded position 11, the display panel 300 can be bent normally to prevent the display panel 300 from being damaged.

Further, lengths of the second support sections 212 are the same as a depth of the clearance 110. When the display panel 300 is in the folded position 11, surfaces of the second support sections 212 abut against a surface of the clearance 110. Especially, end surfaces of the second ends 202 of the support plates 200 can abut against a bottom surface of the clearance 110. With the above arrangement, achieving an effective limitation to a position of the support plates 200 is facilitated, thereby ensuring the stability of the form of the display panel 300. Of course, in other embodiments, the depth of the clearance 110 may be greater than the lengths of the second support sections 212.

It should be noted that the lengths of the second support sections 212 referred to here is specifically lengths of the second support sections 212 along the second direction X when the display panel 300 is in the unfolded position 12 (as shown in FIG. 2), or lengths of the second support sections 212 along the height direction H when the display panel 300 is in the folded position 11, (as shown in FIG. 3).

Further, as shown in FIG. 2, when the display panel 300 is in the unfolded position 12, the second ends 202 of two support plates 200 in the support body 210 are in contact with each other. With the above arrangement, when the display panel 300 is in the unfolded position 12, surfaces of adjacent support plates 200 are flush, and there is no gap between the adjacent support plates 200. The adjacent support plates 200 can better cooperate and support the display panel 300 to ensure that when the display panel 300 is in the unfolded position 12, the display panel 300 is provided with the support plates 200 therebelow at any position to avoid the display panel 300 from being depressed, easily deformed, etc., so that the display panel 300 is better supported.

As shown in FIG. 2 and FIG. 3, along the height direction H in FIG. 2 and along the second direction X in FIG. 3, each support plate 200 includes a first surface 205 and a second surface 206 arranged opposite to each other. The first surface 205 is configured to abut against the display panel 300. At least at the second end, the first surface 205 and the second surface 206 are connected by an arc 207, and in a direction from the second surface 206 to the first surface 205, a size of the second end 202 of the support plate 200 gradually narrows.

In the above arrangement, when the display panel 300 is in the unfolded position 12, two support plates 200 in the support body 210 are connected by sides of the second ends 202 close to the first surfaces 205 that abut against each other, and are used for supporting the display panel 300. When the display panel 300 is switched from the unfolded position 12 to the folded position 11, the two support plates 200 in the support body 210 are rotated in opposite directions and enter the clearance 110. Since, in the direction from the second surface 206 to the first surface 205, the size of the second ends 202 of the support plates 200 gradually narrows, during the rotation of the support plates 200, there is a gap between rotation tracks of the second ends 202 of two adjacent support plates 200 to prevent the second ends 202 of the two support plates 200 from colliding with each other during their rotation so as to ensure the stability of the rotation.

As shown in FIGS. 5-8, further, the electronic device 10 further includes connecting mechanisms 400. The connecting mechanisms 400 are respectively arranged directly above the clearance 110 and on both ends of the support plates 200 and/or the housing 100 along the first direction Y to prevent the connecting mechanisms 400 from occupying the volume of the clearance 110, so that when the display panel 300 is in the folded position 11, a part of the display panel 300 entering the clearance 110 does not contact the connecting mechanisms 400.

Figure 5:
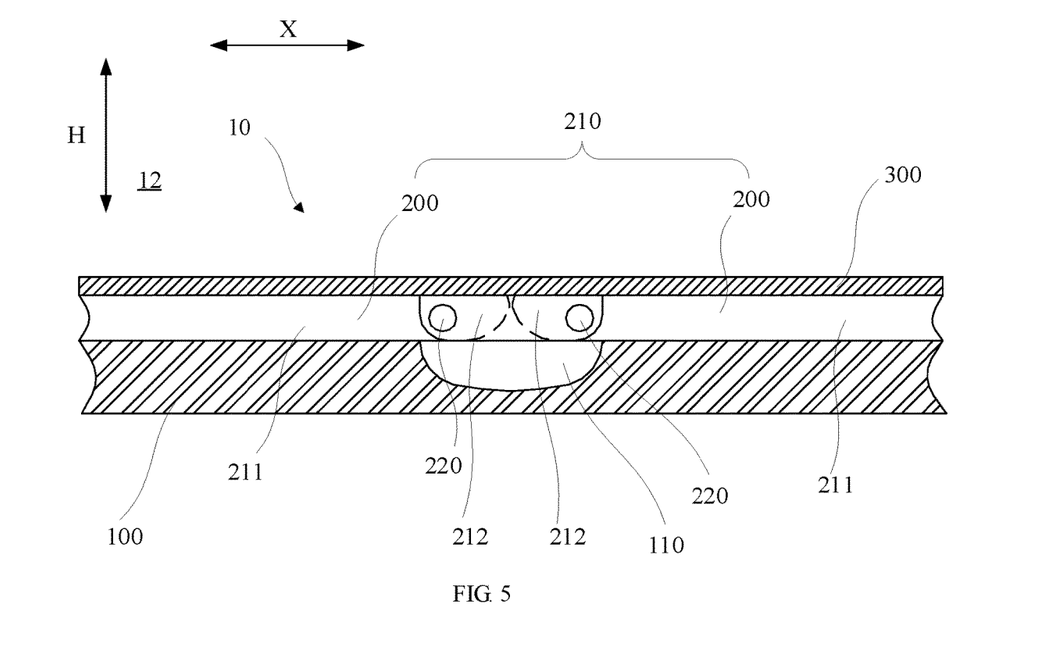
FIG. 5 is a schematic diagram illustrating a structure of an electronic device according to another embodiment of the present application.
Figure 6:
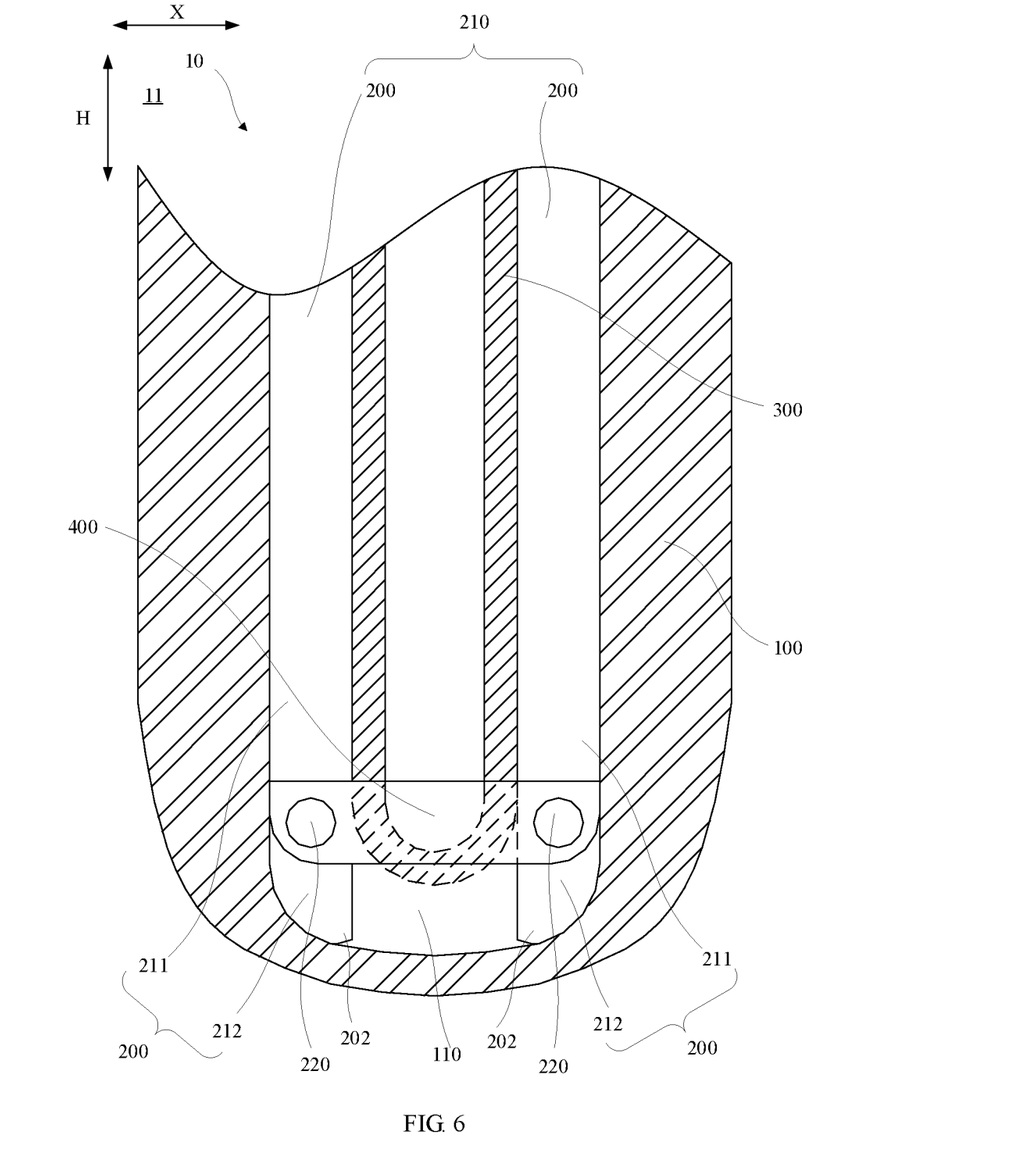
FIG. 6 is a schematic diagram illustrating another structure of an electronic device according to another embodiment of the present application.

As shown in FIG. 5 and FIG. 6, in an embodiment, the connecting mechanisms 400 can be of a rod-shaped structure extending along a single direction. Two ends of a connecting mechanism 400 are respectively connected with the fixation points 220 of the two support plates 200 in the support body 210. When the display panel 300 is switched between the unfolded position 12 and the folded position 11, relative positions between the connecting mechanisms 400 and the clearance 110 of the housing 100 do not change. In addition, a friction coefficient between the connecting mechanisms 400 and the support plates 200 is relatively large, so that relative positions between the connecting mechanisms 400 and the support plates 200 can be maintained stable by friction between the connecting mechanisms 400 and the support plates 200, ensuring that the display panel 300 can relatively stably remain in the unfolded position 12 or the folded position 11. Of course, in other embodiments, the limitation of positions between the support plates 200 and the display panel 300 can alternatively be achieved by additionally providing other position-limiting devices.

Since the display panel 300 is to be switched between the unfolded position 12 and the folded position 11, the housing 100 is to be arranged as a flexible housing 100, or a part of the housing 100 where the clearance 110 is arranged is to be made of a flexible and elastically deformable material.

Figure 7:
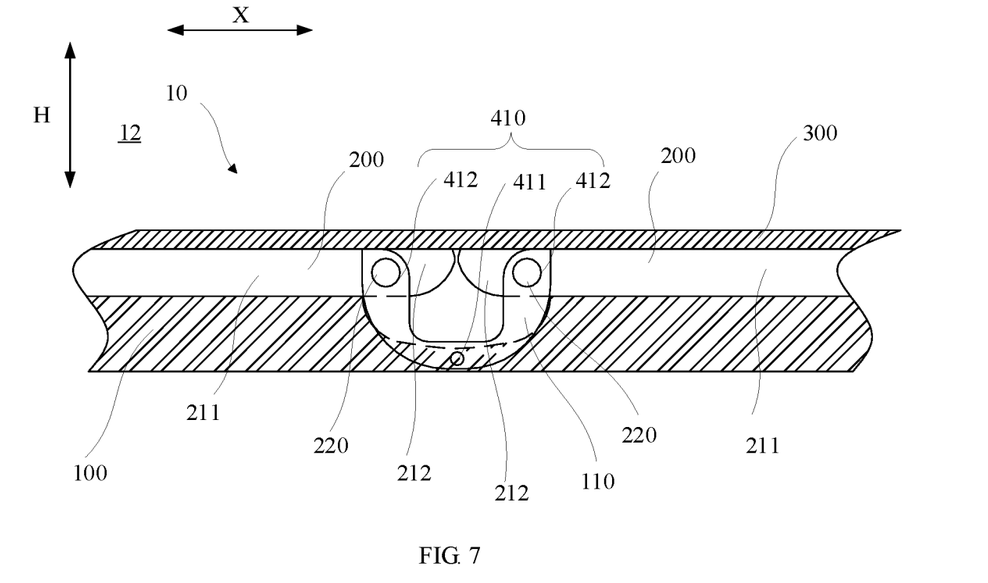
FIG. 7 is a schematic diagram illustrating a structure of an electronic device according to yet another embodiment of the present application.
Figure 8:
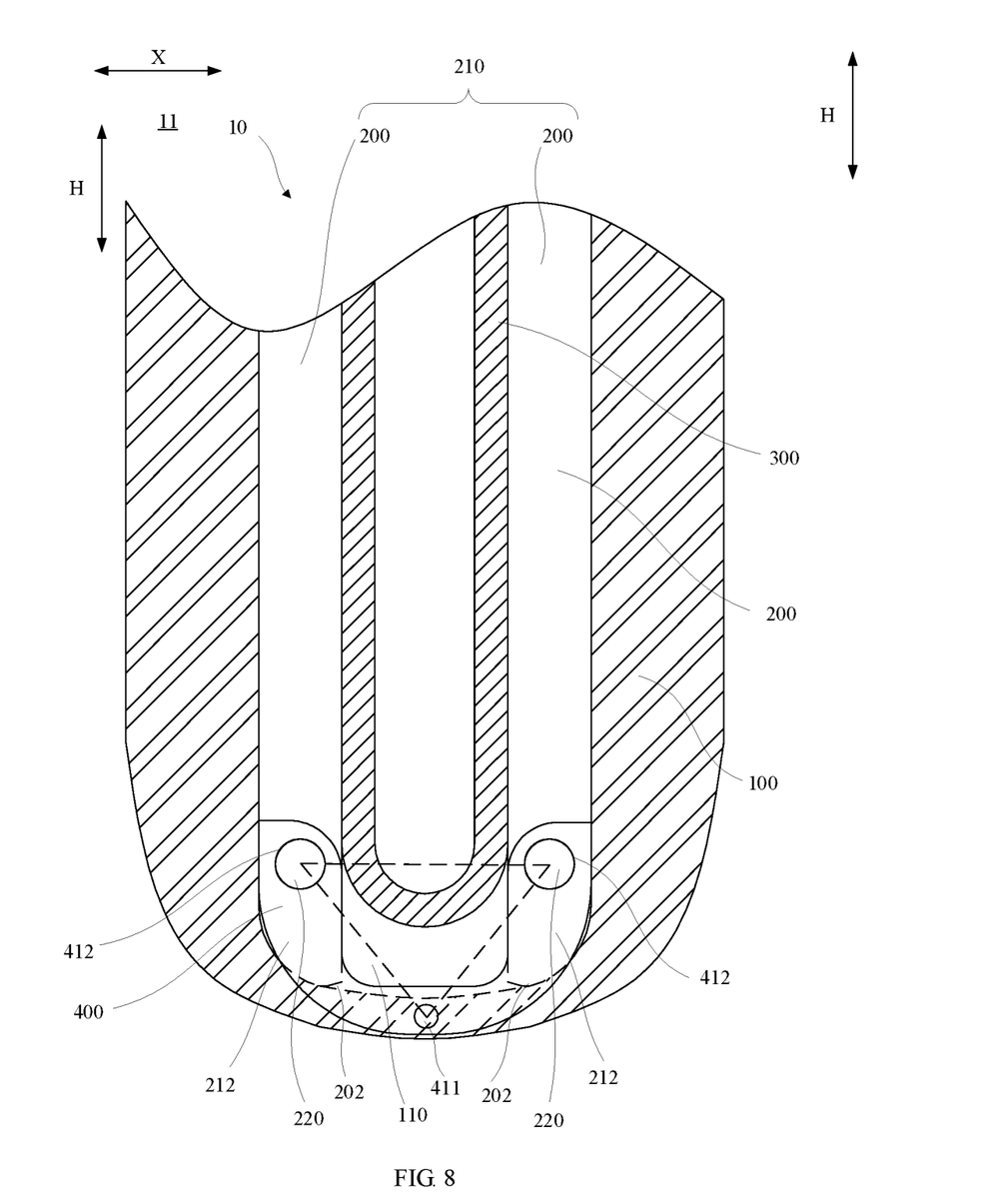
FIG. 8 is a schematic diagram illustrating another structure of an electronic device according to yet another embodiment of the present application.
Figure 9:
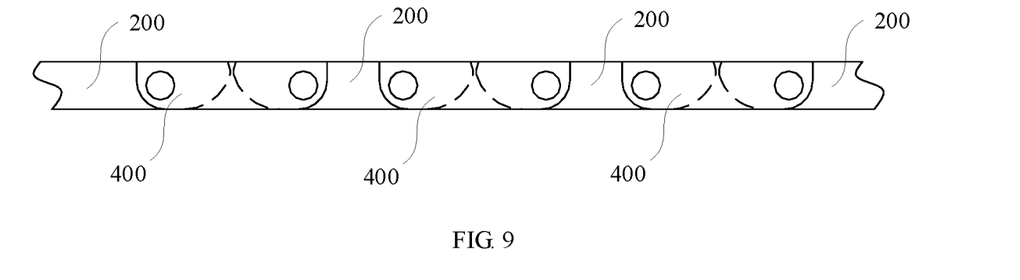
FIG. 9 is a schematic diagram illustrating a structure of support plates and connecting mechanisms according to still another embodiment of the present application.
Figure 10:
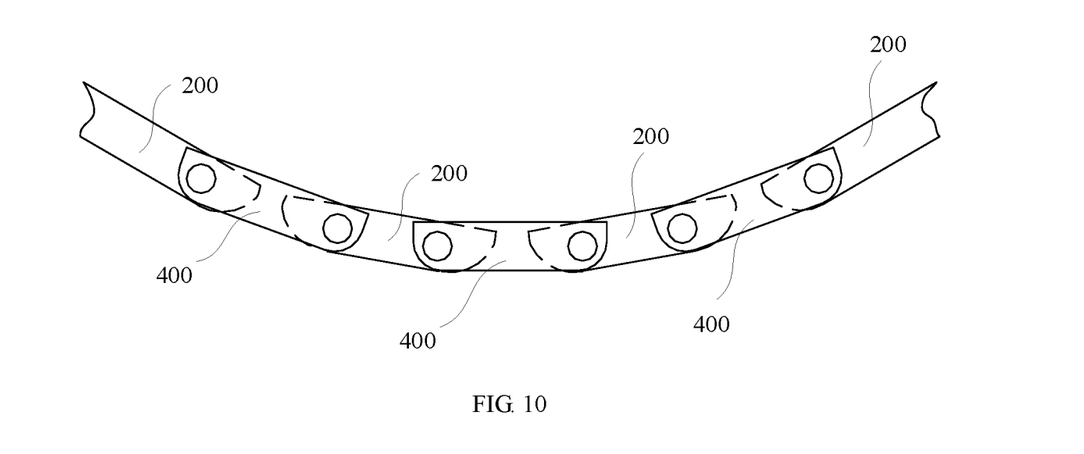
FIG. 10 is a schematic diagram illustrating another structure of support plates and connecting mechanisms according to still another embodiment of the present application.

As shown in FIG. 7 and FIG. 8, in another embodiment, the connecting mechanism 400 includes three positioning points 410, where two positioning points 410 are respectively connected with the fixation points 220 of two support plates 200 in the support body 210, and the remaining positioning point 410 is connected with the housing 100. The fixation points 220 and the positioning points 410 may be connected by bolts. Of course, their connection can alternatively be realized in other ways. Connecting lines of the three positioning points 410 form a triangle (refer to the dotted lines in FIG. 8). With the above arrangement, the connecting mechanism 400 and two support plates 200 can form a stable triangular structure.

The positioning point 410 fixedly connected with the housing 100 is used as a first positioning point 411, and the positioning points 410 fixedly connected with the fixation points 220 of the support plates 200 are used as second positioning points 412. Distances from the first positioning point 411 to the two second positioning points 412 are same, and the connecting lines of the three positioning points 410 form an equilateral or isosceles triangle. Of course, in other embodiments, the connecting lines of the three positioning points 410 may alternatively form a triangle with three unequal sides.

It should be noted that the connecting mechanism 400 and the housing 100 can be two separate components, and the connecting mechanism 400 and the housing 100 can be connected by welding, tenoning, screwing, etc. Of course, the connecting mechanism 400 and the housing 100 may alternatively be an integrally formed component.

In the above embodiments, a surface of the connecting mechanism 400 contacts side and bottom surfaces of the clearance 110, increasing a contact area between the connecting mechanism 400 and the clearance 110. At the same time, a shape of the connecting mechanism 400 is adapted to a shape of the clearance 110, which can enhance a stability of positioning of the connecting mechanism 400. A bottom end of the connecting mechanism 400 is provided with the first positioning point 411, and the connecting mechanism 400 and the housing 100 are fixed together via the first positioning point 411.

Further, on one end surface, when a number of the connecting mechanisms 400 is n, the number of the support plates 200 is n+1, and the number of the clearances is n, where n is a positive integer. In the above embodiments, as shown in FIGS. 1 to 8, the number of the connecting mechanism 400 is one, and the number of the support plates 200 is two. Of course, as shown in FIGS. 9-13, in other embodiments, on one end surface, the number of the connecting mechanisms 400 can be multiple, and the number of the support plates 200 is always one more than the number of the connecting mechanisms 400. Therefore, for each support plate 200 other than support plates at two ends, two ends thereof can include two fixation points, and are respectively connected with two connecting mechanisms 400; and for the support plates at two ends, only an end connected with the connecting mechanism thereof is provided with the fixation point. In some embodiments, all support plates have fixation points at both ends. When the number of the connecting mechanism 400 is multiple, and when the display panel is in the folded position, a part of the display panel in the clearances can be supported by the support plates 200, so that the display panel is protected. At the same time, another part of the display panel enters a gap between two adjacent support plates 200 to avoid piling of the display panel, which ensures user experience. Please refer to the above description adaptively for each structure of the display device 10 and its specific mode of action, which will not be repeated here.

Figure 11:
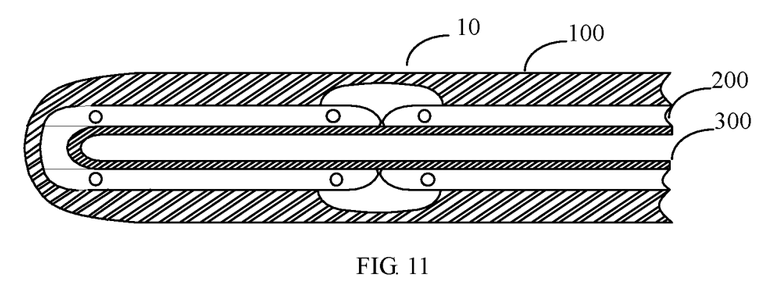
FIG. 11 is a schematic diagram illustrating yet another structure of support plates and connecting mechanisms according to still another embodiment of the present application.
Figure 12:
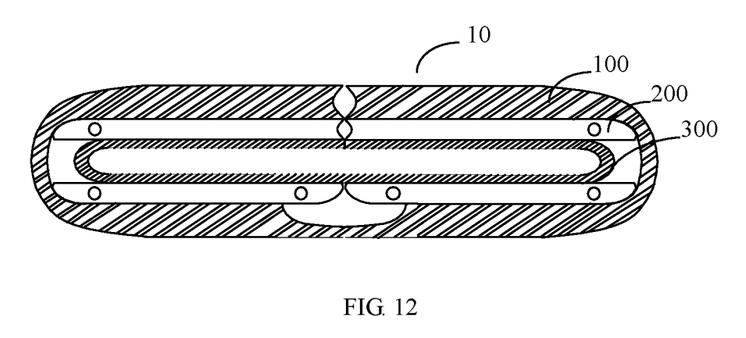
FIG. 12 is a schematic diagram illustrating still another structure of support plates and connecting mechanisms according to still another embodiment of the present application.
Figure 13:
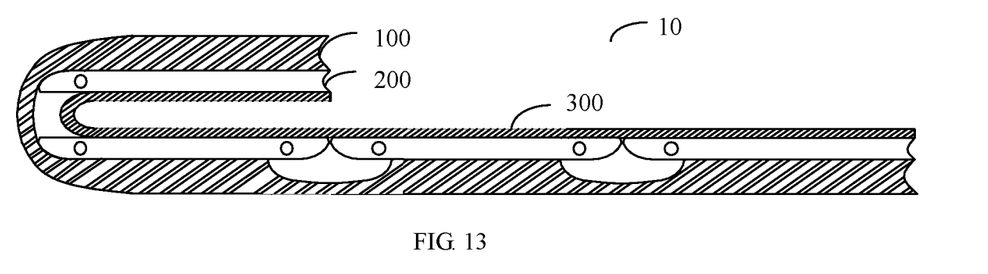
FIG. 13 is a schematic diagram illustrating another structure of support plates and connecting mechanisms according to still another embodiment of the present application.

As shown in FIG. 11 and FIG. 12, when four support plates are included, the display panel can be folded completely in half in two ways. It should be noted that the display device 10 may not be provided with a connecting mechanism. Of course, alternatively, any of the above-mentioned connecting mechanisms (not shown) may be provided, and this application has no limitation thereto. In addition, the display panel can be folded as shown in FIG. 13.

Similarly, when multiple support plates are included, the display panel can be folded in at least two ways.

In addition, it should be noted that the structure of one end surface of the electronic device is shown in the drawings, and the other end surface has a same structure.

The above are only embodiments of the present application, which are not intended to make any formal restriction on this application. Any person skilled in the art, without departing from the scope of the technical solutions of the present application, can make some changes or modifications to the technical contents disclosed above as equivalent embodiments with equivalent changes. However, without departing from the contents of the technical solutions of the present application, any simple revisions, equivalent changes and modifications made to the above embodiments based on the technical essence of the present application still fall within the scope of the technical solutions of the present application.

The invention claimed is:

1. An electronic device, comprising:
a housing recessed inward to form one or more clearances penetrating the housing along a first direction;
support plates, wherein a number of the support plates is at least two, and one clearance is correspondingly arranged below adjoining parts of two adjacent support plates; and
a display panel, wherein the support plates are configured to support the display panel,
wherein the display panel is switchable between a folded position and an unfolded position;
when the display panel is in the unfolded position, first surfaces of the support plates that abut against the display panel are flush; when the display panel is in the folded position, any two oppositely folded and adjacent support plates are separated by a part of the display panel that covers the any two oppositely folded and adjacent support plates when the display panel is in the unfolded position, and a part of the any two oppositely folded and adjacent support plates and a part of the display panel that covers the part of the any two oppositely folded and adjacent support plates when the display panel is in the unfolded position enter a corresponding clearance;
wherein the number of the support plates is two, and the two support plates correspond to one clearance; two end surfaces of each of the support plates along the first direction are respectively provided with a fixation point, and the support plates are rotatable around respective fixation points;
wherein the electronic device further comprises connecting mechanisms, two ends of each of the connecting mechanisms are respectively connected with the fixation points on the end surfaces of the two support plates on a same side along the first direction;
wherein each of the connecting mechanisms comprises at least three positioning points, two of the positioning points are respectively connected with the fixation points on the end surfaces of the two support plates on the same side along the first direction, and remaining one of the positioning points is connected with the housing;
wherein connecting lines of the three positioning points form a triangle.

2. The electronic device according to claim 1, wherein
along a second direction, each of the support plates comprises a first end and a second end, and the first end is far away from the clearance relative to the second end; the second direction is perpendicular to the first direction; each of the support plates comprises a first support section and a second support section, the first support section extends from the first end to fixation points on both sides along the first direction, and the second support section extends from the second end to the fixation points on both sides along the first direction;
when the display panel is in the unfolded position, second support sections of the two support plates are located above the clearance; when the display panel is in the folded position, the second support sections of the two support plates are located inside the clearance.

3. The electronic device according to claim 2, wherein lengths of the second support sections of the two support plates along the second direction are same as a depth of the clearance; and when the display panel is in the folded position, surfaces of the second support sections of the two support plates abut against a surface of the clearance.

4. An electronic device, comprising:
a housing recessed inward to form one or more clearances penetrating the housing along a first direction;
support plates, wherein a number of the support plates is at least two, and one clearance is correspondingly arranged below adjoining parts of two adjacent support plates; and
a display panel, wherein the support plates are configured to support the display panel,
wherein the display panel is switchable between a folded position and an unfolded position;
when the display panel is in the unfolded position, first surfaces of the support plates that abut against the display panel are flush; when the display panel is in the folded position, any two oppositely folded and adjacent support plates are separated by a part of the display panel that covers the any two oppositely folded and adjacent support plates when the display panel is in the unfolded position, and a part of the any two oppositely folded and adjacent support plates and a part of the display panel that covers the part of the any two oppositely folded and adjacent support plates when the display panel is in the unfolded position enter a corresponding clearance;
wherein the number of the support plates is more than two; along a second direction, each of the support plates comprises two ends arranged oppositely, each of the support plates is respectively provided with fixation points on two end surfaces along the first direction and at a predetermined distance from the ends, the support plates are rotatable around respective fixation points, and the second direction is perpendicular to the first direction;
wherein the electronic device further comprises connecting mechanisms, two ends of each of the connecting mechanisms are respectively connected with adjacent fixation points on end surfaces of two adjacent support plates on a same side along the first direction;
wherein each of the connecting mechanisms comprises at least three positioning points, wherein two of the positioning points are respectively connected with the adjacent fixation points on the end surfaces of the two adjacent support plates on the same side along the first direction, and remaining one of the positioning points is fixedly connected with the housing;
wherein connecting lines of the three positioning points form a triangle.

5. The electronic device according to claim 2, wherein when the display panel is in the unfolded position, second ends of the two support plates are in contact with each other.

6. The electronic device according to claim 5, wherein, along a height direction, each of the support plates further comprises a second surface, and the second surface is arranged opposite to the first surface; the height direction is perpendicular to the first direction and the second direction;
at least at the second end of the support plate, the first surface and the second surface are connected by an arc, and in a direction from the second surface to the first surface, a size of the second end of the support plate gradually narrows.

7. The electronic device according to claim 2, wherein when the display panel is in the folded position, a distance between the two support plates is greater than or equal to a minimum bending diameter of the display panel.

8. The electronic device according to claim 4, wherein,
each of the support plates comprises a first support section and two second support sections, on each of the end surfaces, the first support section extends from one of the fixation points to other of the fixation points, and the second support sections respectively extend from the ends to adjacent fixation points;
when the display panel is in the unfolded position, each of the second support sections is located above a corresponding clearance; when the display panel is in the folded position, the second support sections on a folded side of the any two oppositely folded and adjacent support plates are located inside the corresponding clearance.

9. The electronic device according to claim 8, wherein lengths of the second support sections of each of the support plates are respectively same as a depth of the corresponding clearance;
when the display panel is in the folded position, surfaces of the second support sections on the folded side of the any two oppositely folded and adjacent support plates abut against a surface of the corresponding clearance.

10. The electronic device according to claim 8, wherein when the display panel is in the unfolded position, adjacent ends of the two adjacent support plates are in contact with each other.

11. The electronic device according to claim 10, wherein, along a height direction, each of the support plates further comprises a second surface, and the second surface is arranged opposite to the first surface; the height direction is perpendicular to the first direction and the second direction;
at least at the adjacent ends of the two adjacent support plates, the first surfaces and the second surfaces are connected by arcs, and in a direction from the second surfaces to the first surfaces, sizes of the ends gradually narrow.

12. The electronic device according to claim 8, wherein when the display panel is in the folded position, a distance between the any two oppositely folded and adjacent support plates is greater than or equal to a minimum bending diameter of the display panel.

* * * * *